US009840281B2

(12) United States Patent
Tyan et al.

(10) Patent No.: US 9,840,281 B2
(45) Date of Patent: *Dec. 12, 2017

(54) TWELVE-CORNERED STRENGTHENING MEMBER

(71) Applicant: FORD GLOBAL TECHNOLOGIES, LLC, Dearborn, MI (US)

(72) Inventors: Tau Tyan, Northville, MI (US); Leonard Anthony Shaner, New Baltimore, MI (US); Yu-Kan Hu, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,299

(22) Filed: Nov. 2, 2015

(65) Prior Publication Data
US 2016/0052557 A1  Feb. 25, 2016

Related U.S. Application Data

(63) Continuation of application No. 14/010,115, filed on Aug. 26, 2013, now Pat. No. 9,174,678, which is a
(Continued)

(51) Int. Cl.
*B62D 21/15* (2006.01)
*B60R 19/34* (2006.01)
(Continued)

(52) U.S. Cl.
CPC .............. *B62D 21/15* (2013.01); *B60R 19/34* (2013.01); *B62D 21/152* (2013.01); *B62D 25/00* (2013.01);
(Continued)

(58) Field of Classification Search
CPC ......... B60R 19/24; B60R 19/26; B60R 19/34; B62D 21/02; B62D 21/15; B62D 21/152; B62D 21/155; B62D 25/08; B62D 25/085
(Continued)

(56) References Cited

U.S. PATENT DOCUMENTS 2,205,893 A   6/1840   Unger
1,951,292 A   3/1934   Cahill
(Continued)

FOREIGN PATENT DOCUMENTS

JP    08-337183      12/1996
JP    3897542 B2    1/2007
(Continued)

OTHER PUBLICATIONS

Machine translation for JP08-337183.
(Continued)

*Primary Examiner* — Jason S Daniels
(74) *Attorney, Agent, or Firm* — Jones Robb, PLLC; Jason Rogers

(57) ABSTRACT

A strengthening member for an automotive vehicle comprises a twelve-cornered cross section including sides and corners creating eight internal angles and four external angles. Each internal angle and each external angle is greater than 90°. At least a portion of the strengthening member tapers along its length.

26 Claims, 9 Drawing Sheets

Related U.S. Application Data continuation of application No. 12/233,808, filed on Sep. 19, 2008, now Pat. No. 8,539,737.

(51) Int. Cl.
  *B62D 25/00* (2006.01)
  *B62D 25/08* (2006.01)
  *B62D 29/00* (2006.01)
  *F16F 7/12* (2006.01)

(52) U.S. Cl.
  CPC .......... *B62D 25/082* (2013.01); *B62D 29/00* (2013.01); *B62D 29/007* (2013.01); *B62D 29/008* (2013.01); *F16F 7/128* (2013.01); *Y10T 29/49622* (2015.01)

(58) Field of Classification Search
  USPC ........... 296/187.03, 187.09, 187.11, 193.07, 296/193.08, 193.09, 203.01, 203.02, 296/203.04, 205; 293/132, 133; 52/843
  See application file for complete search history.

(56) References Cited

U.S. PATENT DOCUMENTS

| | | | |
|---|---|---|---|
| 2,340,003 | A | 1/1944 | McDermot |
| 2,837,347 | A | 6/1958 | Barenyi |
| 2,856,226 | A | 10/1958 | Purdy |
| 3,092,222 | A | 6/1963 | Heinle |
| 3,209,432 | A | 10/1965 | Cape |
| 3,412,628 | A | 11/1968 | De Gain |
| 4,018,055 | A | 4/1977 | Clercq |
| 4,364,216 | A | 12/1982 | Koller |
| 5,431,445 | A | 7/1995 | Wheatley |
| 5,480,189 | A | 1/1996 | Davies et al. |
| 5,729,463 | A | 3/1998 | Koenig et al. |
| 5,913,565 | A | 6/1999 | Watanabe |
| 6,068,330 | A | 5/2000 | Kasuga et al. |
| 6,179,355 | B1 | 1/2001 | Chou et al. |
| 6,371,540 | B1 | 4/2002 | Campanella et al. |
| 6,523,576 | B2 | 2/2003 | Imaeda et al. |
| 6,588,830 | B1 | 7/2003 | Schmidt et al. |
| 6,705,653 | B2 | 3/2004 | Gotanda et al. |
| 6,752,451 | B2 | 6/2004 | Sakamoto et al. |
| 6,799,794 | B2 | 10/2004 | Mochidome et al. |
| 6,893,065 | B2 | 5/2005 | Seksaria et al. |
| 7,044,515 | B2 | 5/2006 | Mooijman et al. |
| 7,252,314 | B2 | 8/2007 | Tamura et al. |
| 7,264,274 | B2 | 9/2007 | Ridgway |
| 7,303,219 | B2 | 12/2007 | Trabant et al. |
| 7,357,445 | B2 | 4/2008 | Gross et al. |
| 7,407,219 | B2 | 8/2008 | Glasgow et al. |
| 7,445,097 | B2 | 11/2008 | Tamura et al. |
| 7,926,160 | B2 | 4/2011 | Zifferer et al. |
| 8,459,726 | B2 | 6/2013 | Tyan et al. |
| 8,469,416 | B2 | 6/2013 | Haneda et al. |
| 8,539,737 | B2 | 9/2013 | Tyan et al. |
| 8,641,129 | B2 | 2/2014 | Tyan et al. |
| 8,659,659 | B2 | 2/2014 | Bradai et al. |
| 9,174,678 | B2 * | 11/2015 | Tyan .................. B62D 21/152 |
| 2002/0059087 | A1 | 5/2002 | Wahlbin et al. |
| 2002/0153719 | A1 | 10/2002 | Taguchi |
| 2003/0085592 | A1 | 5/2003 | Seksaria et al. |
| 2005/0028710 | A1 | 2/2005 | Carpenter et al. |
| 2006/0033363 | A1 | 2/2006 | Hillekes et al. |
| 2006/0181072 | A1 | 8/2006 | Tamura et al. |
| 2006/0202493 | A1 | 9/2006 | Tamura et al. |
| 2006/0202511 | A1 | 9/2006 | Tamura et al. |
| 2006/0249342 | A1 | 11/2006 | Canot et al. |
| 2008/0012386 | A1 | 1/2008 | Kano et al. |
| 2008/0030031 | A1 | 2/2008 | Nilsson et al. |
| 2008/0036242 | A1 | 2/2008 | Glance et al. |
| 2008/0098601 | A1 | 5/2008 | Heinz et al. |
| 2008/0106107 | A1 | 5/2008 | Tan et al. |
| 2008/0185852 | A1 | 8/2008 | Suzuki et al. |
| 2009/0026777 | A1 | 1/2009 | Schmid et al. |
| 2009/0085362 | A1 | 4/2009 | Terada et al. |
| 2009/0102234 | A1 | 4/2009 | Heatherington et al. |
| 2009/0174219 | A1 | 7/2009 | Foreman |
| 2010/0064946 | A1 | 3/2010 | Watson |
| 2010/0066124 | A1 | 3/2010 | Terada et al. |
| 2010/0072788 | A1 | 3/2010 | Tyan et al. |
| 2010/0102592 | A1 | 4/2010 | Tyan et al. |
| 2011/0015902 | A1 | 1/2011 | Cheng et al. |
| 2011/0102592 | A1 | 5/2011 | Bradai et al. |
| 2012/0261949 | A1 | 10/2012 | Tyan et al. |
| 2013/0300138 | A1 | 11/2013 | Banasiak et al. |
| 2013/0341115 | A1 | 12/2013 | Tyan et al. |
| 2015/0197206 | A1 | 7/2015 | Tamura et al. |
| 2016/0068194 | A1 | 3/2016 | Tyan et al. |

FOREIGN PATENT DOCUMENTS

| | | |
|---|---|---|
| JP | 2008261493 A | 10/2008 |
| JP | 04-371059 A | 11/2009 |
| JP | 5348910 B2 | 8/2013 |
| JP | 2015124784 A | 7/2015 |

OTHER PUBLICATIONS

JP08-337183 English Abstract.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).
Yoshiaka Nakazawa et al., "Development of Crash-Box for Passenger Car With High Capability for Energy Absorption", VIII International Conference on Computation Plasticity (COMPLAS VIII), Barcelona, 2005.
Office Action dated Aug. 17, 2012 from U.S. Appl. No. 13/087,663.
Nov. 16, 2012 Response to Office Action dated Aug. 17, 2012 from U.S. Appl. No. 13/087,663.
Office Action dated Mar. 2, 2015 from U.S. Appl. No. 14/010,115.
Office Action dated Mar. 16, 2015 from U.S. Appl. No. 14/010,115.
Office Action dated Sep. 15, 2014 from U.S. Appl. No. 13/902,116.
Dec. 12, 2014 Response to Office Action dated Sep. 15, 2014 from U.S. Appl. No. 13/902,116.
Office Action dated Aug. 19, 2011 from U.S. Appl. No. 12/233,808.
Nov. 11, 2011 Response to Office Action dated Aug. 19, 2011 from U.S. Appl. No. 12/233,808.
Office Action dated Mar. 7, 2012 from U.S. Appl. No. 12/233,808.
Jun. 6, 2012 Response to Office Action dated Mar. 7, 2012 from U.S. Appl. No. 12/233,808.
Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.

(56) References Cited

OTHER PUBLICATIONS

Apr. 22, 2013 Response to Office Action dated Feb. 21, 2013 from U.S. Appl. No. 12/651,614.
Advisory Action dated May 6, 2013 from co-pending U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Extended European Search Report for Application No. 15195185.2, dated May 19, 2016.
Office Action dated Dec. 17, 2015 from U.S. Appl. No. 12/891,801.
PABR filed on Mar. 17, 2016 PABR in Response to NFOA dated Dec. 17, 2015 from U.S. Appl. No. 12/891,801.
Final Office Action dated May 15, 2017 from co-pending U.S. Appl. No. 14/942,385.

* cited by examiner

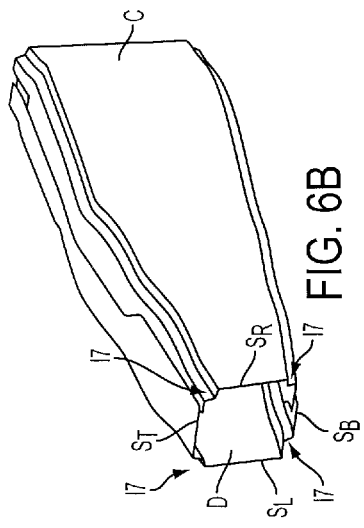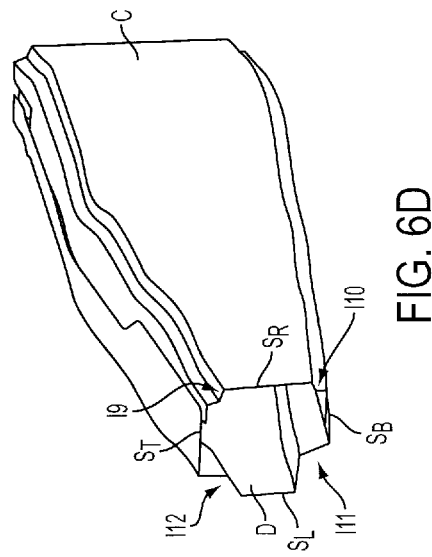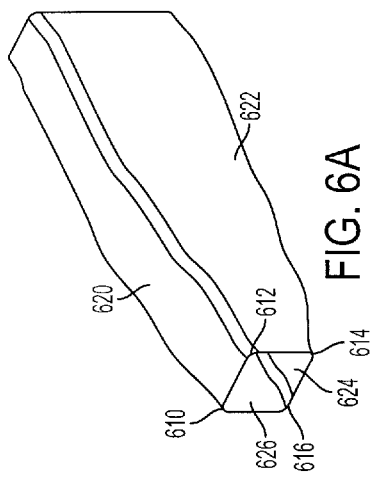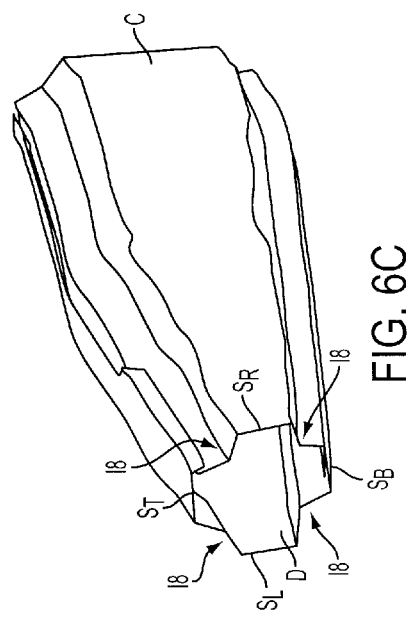

TWELVE-CORNERED STRENGTHENING MEMBER

This application is a continuation of U.S. patent application Ser. No. 14/010,115, filed Aug. 26, 2013, which is a continuation of U.S. patent application Ser. No. 12/233,808, filed Sep. 19, 2008 (now U.S. Pat. No. 8,539,737), the entire content of each of which is incorporated herein by reference.

TECHNICAL FIELD

The present teachings relate generally to a strengthening member for a vehicle body or other structures. The present teachings relate more specifically to a strengthening member having a twelve-cornered cross section.

BACKGROUND

It is desirable, for vehicle strengthening members, to maximize impact energy absorption and bending resistance while minimizing mass per unit length of the strengthening member.

When a compressive force is exerted on a strengthening member, for example a force due to a front impact load on a vehicle's front rail or other strengthening member in the engine compartment, the strengthening member can crush in a longitudinal direction to absorb the energy of the collision. In addition, when a bending force is exerted on a strengthening member, for example a force due to a side impact load on a vehicle's front side sill, B-pillar or other strengthening member, the strengthening member can bend to absorb the energy of the collision.

U.S. Pat. No. 6,752,451 discloses a strengthening member having concave portions at the four corners of a basic rectangular cross section, resulting in four U-shaped portions forming an angle of 90 degrees with each other. To avoid cracks at the concave portions at the four corners and to increase strength, the concave portions have increased thickness and hardness. Increased thickness and hardness of the corner portions is disclosed to be achievable only by drawing or hydroforming, and therefore decreases manufacturing feasibility while increasing the mass per unit length of the strengthening member.

U.S. Pat. No. 6,752,451 makes reference to Japanese Unexamined Patent Publication No. H8-337183, which also discloses a strengthening member having concave portions at the four corners of a basic rectangular cross section, resulting in four U-shaped portions forming an angle of 90 degrees with each other. U.S. Pat. No. 6,752,451 states that its thickened concave portions provide improved crush resistance and flexural strength over H8-337183.

It may be desirable to provide a strengthening member configured to achieve the same or similar strength increase as provided by the thickened corners, while minimizing mass per unit length of the member and maintaining a high manufacturing feasibility.

It may further be desirable to provide a strengthening member that can achieve increased energy absorption and a more stable axial collapse when forces such as front and side impact forces are exerted on the strengthening member. Additionally, it may be desirable to provide a strengthening member that possesses improved noise-vibration-harshness performance due to work hardening on its corners.

SUMMARY

In accordance with certain embodiments, the present teachings provide a strengthening member for an automotive vehicle, comprising a twelve-cornered cross section including sides and corners creating internal angles and external angles, wherein each internal angle ranges from about 100° to about 110°, wherein a length of the strengthening member extends between a first end and a second end, and wherein the strengthening member tapers along at least a portion of its length.

In accordance with certain embodiments, the present teachings also provide a motor vehicle. The motor vehicle comprises an engine compartment, a front rail, a side rail, a roof structure, and a strengthening member. The strengthening member comprises a twelve-cornered cross section including sides and corners creating eight internal angles and four external angles, wherein each internal angle and each external angle is greater than 90°. At least a portion of a length of the strengthening member tapers so that a cross-sectional area of the twelve-cornered cross section changes along a longitudinal axis of the strengthening member. The strengthening member forms at least a part of one of the front rail, the side rail; the roof structure, or a cross member of the engine compartment.

In accordance with certain embodiments, a strengthening member for an automotive vehicle, comprises a twelve-cornered cross section including sides and corners creating eight internal angles and four external angles, wherein each internal angle and each external angle is greater than 90°, and wherein at least a portion of a length of the strengthening member tapers so that a cross-sectional area of the twelve-cornered cross section changes along a longitudinal axis of the strengthening member.

Certain embodiments of the present teachings also provide a method for manufacturing a strengthening member for an automotive vehicle, the strengthening member having a twelve-cornered cross section including sides and corners creating internal angles and external angles, wherein each internal angle and each external angle is greater than 90°, and at least a portion of a length of the strengthening member tapering along a longitudinal axis of the strengthening member. The method comprises stamping or pressing two or more sections of the strengthening member, and joining the two or more sections by one or more of welding, adhesion, and fastening to form a cross section having eight internal angles and four external angles.

Additional objects and advantages will be set forth in part in the description which follows, and in part will be obvious from the description, or may be learned by practice of the present teachings. The objects and advantages of the teachings will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the invention and together with the description, serve to explain certain principles of the teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIGS. 6A-6D illustrate a vehicle front rail with convolutions, having varying cross sections including twelve-cornered cross sections in accordance with the present teachings;

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The present teachings contemplate providing a strengthening member with a twelve-cornered cross section having a substantially increased stiffness throughout the sides and corners without increasing thickness within the corners. The strengthening member can achieve increased energy absorption and a more stable axial collapse when forces such as front and side impact forces are exerted on the strengthening member. The strengthening member can also possess improved durability and noise-vibration-harshness (NVH) performance due to work hardening on the twelve corners. The degrees of the internal and external angles of the present teachings can achieve the same strength increase as thickened corners, while minimizing mass per unit length of the member and maintaining a high manufacturing feasibility because the member can be formed by bending, rolling, stamping, pressing, hydro-forming, molding, extrusion, cutting, and forging.

Figure 1:
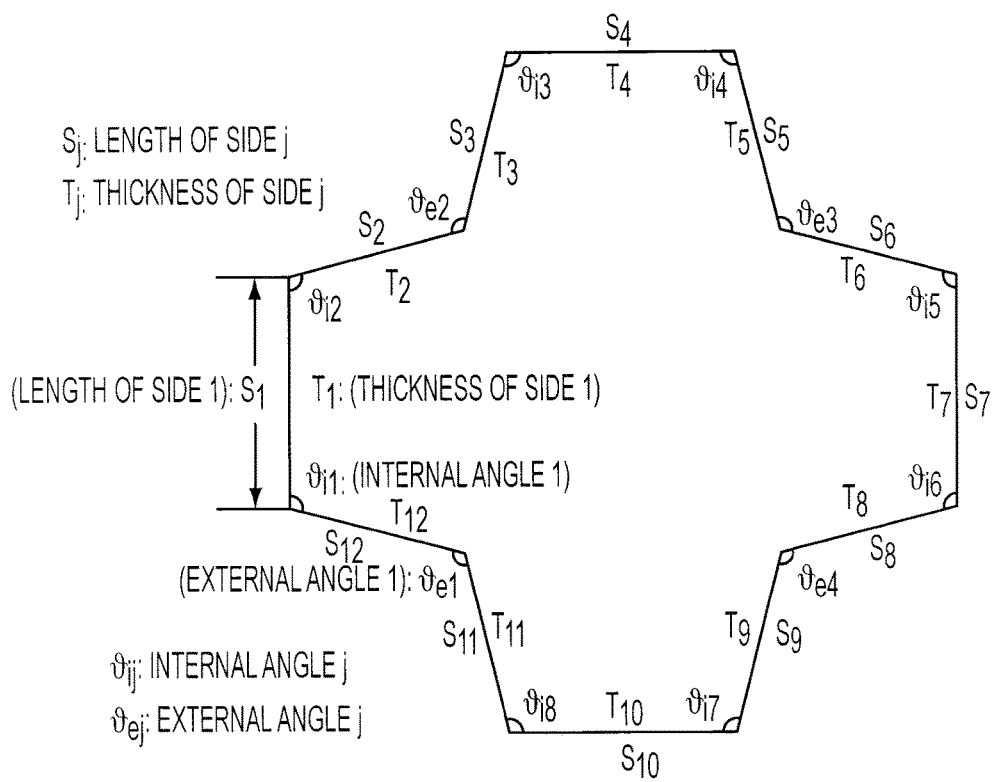
FIG. 1 illustrates an exemplary embodiment of a twelve-cornered cross section for a strengthening member in accordance with the present teachings.

An exemplary embodiment of a twelve-cornered cross section for a strengthening member in accordance with the present teachings is illustrated in FIG. 1. As illustrated, the cross section comprises twelve sides having lengths $S_1$-$S_{12}$ and thicknesses $T_1$-$T_{12}$, eight internal corners with angles $\theta_{i1}$-$\theta_{i8}$ and four external corners with angles $\theta_{e1}$-$\theta_{e4}$. The internal and external angular degrees can be varied to achieve improved strength and other performance features (e.g., stability of folding pattern) compared to existing 90°-angled cross sections. This improve strength obviates the need for increased corner thickness, which is an unexpected and unpredicted benefit of fine-tuning the internal and external angular degrees of a strengthening member having a twelve-sided cross section. In accordance with various embodiments of the present teachings, each internal angle can range from about 100° to about 110°, and each external angle can range from about 105° to about 130°. The lengths $S_1$-$S_{12}$ and thicknesses $T_1$-$T_{12}$ of the sides can be varied to a certain degree, as would be understood by one skilled in the art, for example in accordance with available packaging space within a vehicle.

In certain embodiments of the present teachings a thickness of the sides and corners can range from about 0.7 mm to about 6.0 mm. In certain embodiments, the thickness of the sides is substantially the same as the thickness of the corners.

Conventional strengthening members having square or rectangular cross sections are widely used due to their high manufacturing feasibility. Because a strengthening member with a twelve-cornered cross section in accordance with the present teachings has substantially increased strength and stiffness without requiring thicker corner portions, it has a higher manufacturing feasibility than previously-contemplated twelve-cornered members that have thickened 90° corners. While still providing a desired strength, a strengthening member in accordance with the present teachings can be formed in one or multiple sections by, for example, bending, rolling, stamping, pressing, drawing, hydro-forming, molding, extrusion, cutting, and forging. Thus-formed sections can be joined via welding, adhesive, fastening, or other known joining technologies.

In accordance with certain exemplary embodiments of the present teachings, the thickness of the strengthening member may vary, for example, within one side or from side to side to optimize the overall axial crush and bending performance. Examples of such varied thickness embodiments are illustrated in FIGS. 5D and 6D, which are described in detail below.

Figure 2:
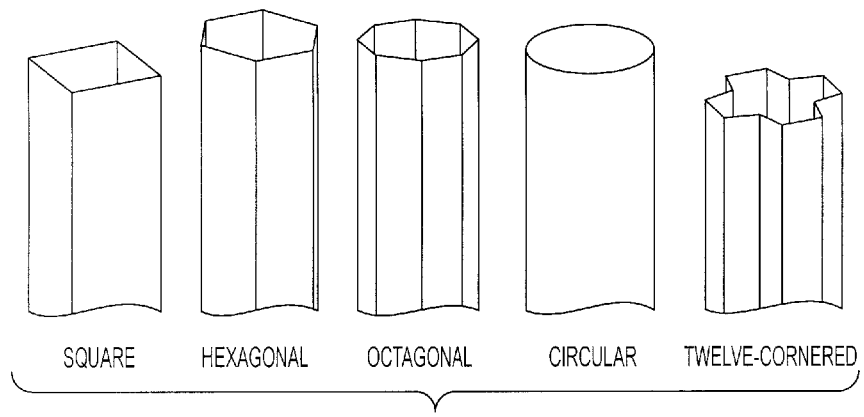
FIG. 2 illustrates strengthening members of varying cross sections having a substantially constant thickness and perimeter.
Figure 3:
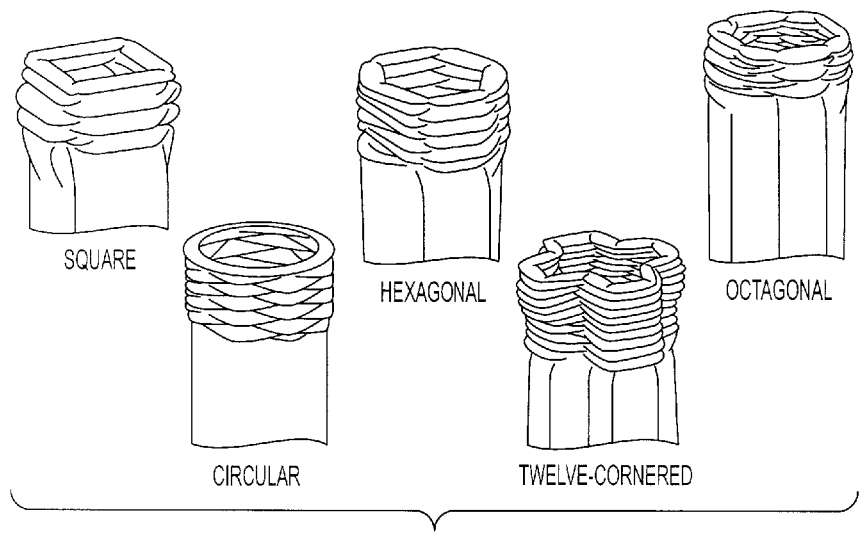
FIG. 3 illustrates an exemplary axial collapse of the strengthening members shown in FIG. 2.

In comparing crash energy absorption of strengthening members of varying shapes having the same thickness and perimeter, as illustrated in FIG. 2, for example for an impact with a rigid wall at 35 mph, a twelve-cornered cross section in accordance with the present teachings demonstrated the shortest crush distance and smallest folding length. The twelve-cornered cross section in accordance with the present teachings also demonstrated the most stable axial collapse and the highest crash energy absorption. In fact, a twelve-cornered cross section in accordance with the present teachings can achieve about a 100% increase in crash energy absorption over a square cross section and a 20-30% increase in crash energy absorption over hexagonal and octagonal cross sections. FIG. 3 illustrates an exemplary axial collapse of the strengthening members shown in FIG. 2. As can be seen, the strengthening member having a twelve-cornered cross section in accordance with the present teachings exhibits the shortest crush distance and most stable folding pattern.

Figure 4:
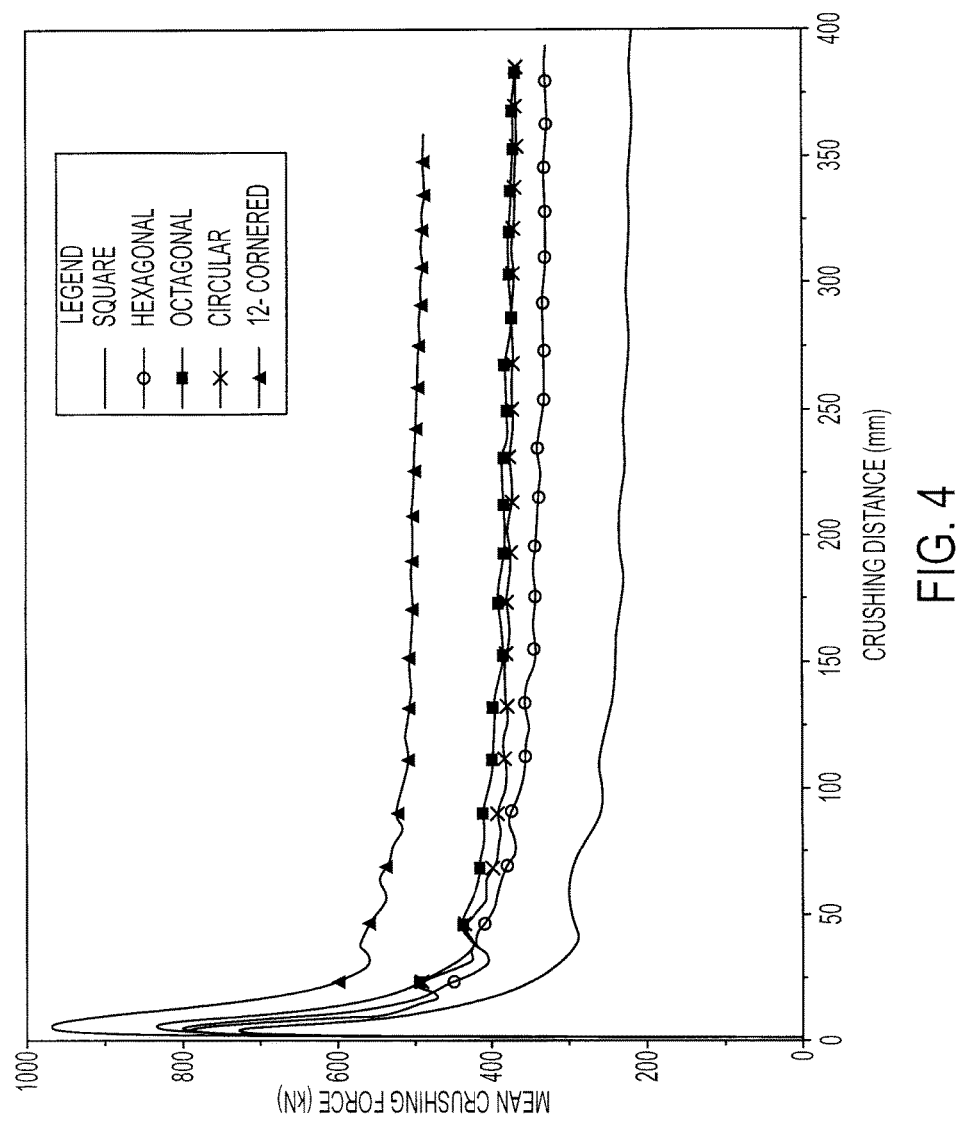
FIG. 4 is a graph of the mean crush force and associated axial crush distance for exemplary strengthening members having the cross sections shown in FIG. 2.

FIG. 4 illustrates a graph of mean crush force for an impact with a rigid wall at 35 mph, in kN, exerted axially on exemplary strengthening members having the cross sections shown in FIG. 2. As can be seen, a strengthening member having a twelve-cornered cross section in accordance with the present teachings can sustain a much higher crushing force for a given resulting crushing distance. This allows improved impact energy management while minimizing mass per unit length.

Figure 9:
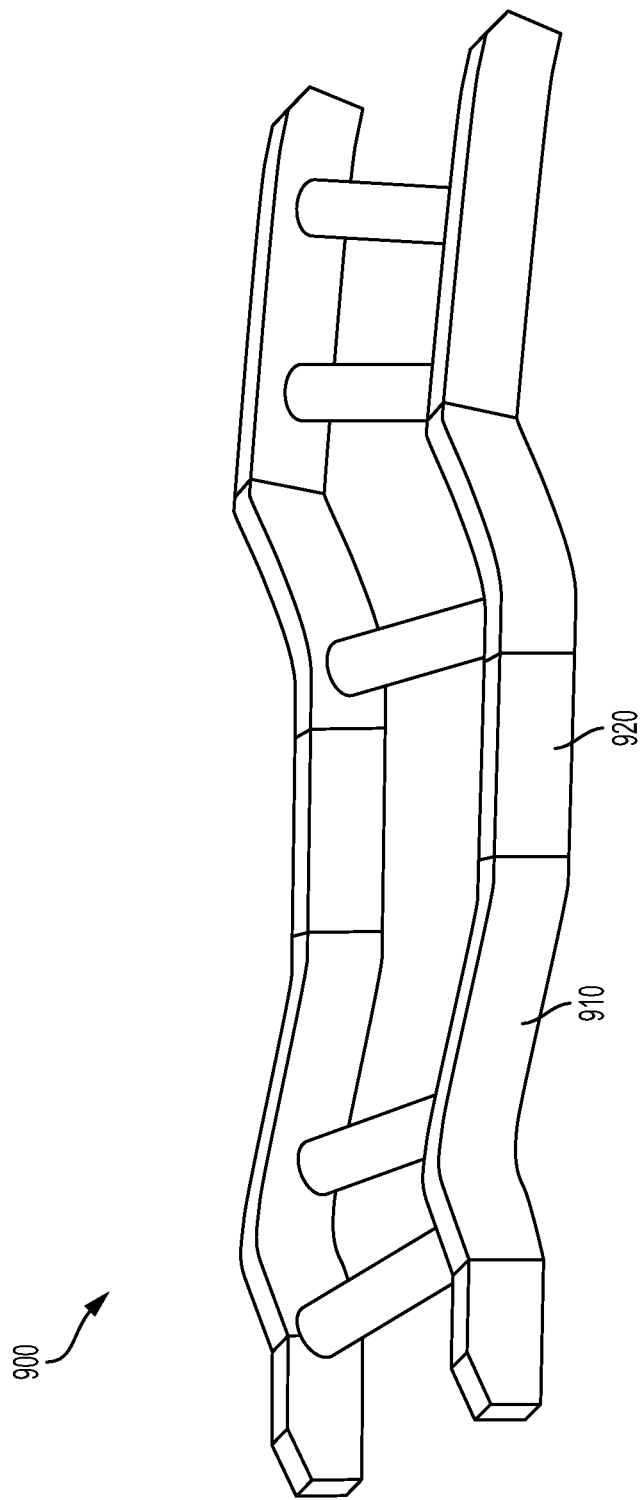
FIG. 9 is a perspective view of a vehicle frame, according to an exemplary embodiment.
Figure 10:
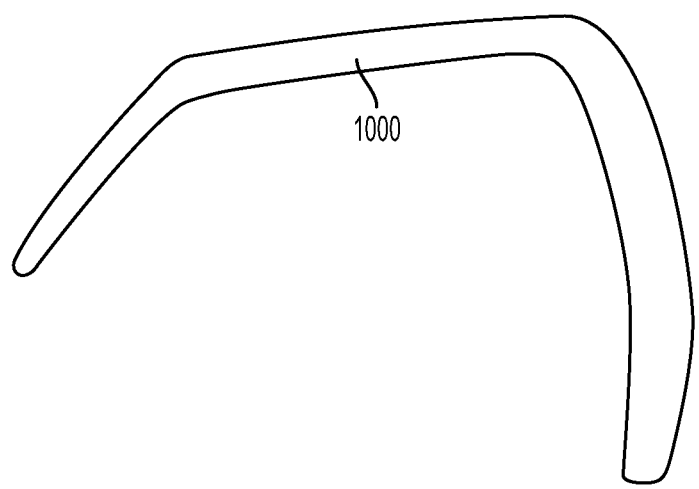
FIG. 10 is a perspective view of a roof structure, according to an exemplary embodiment.
Figure 11:
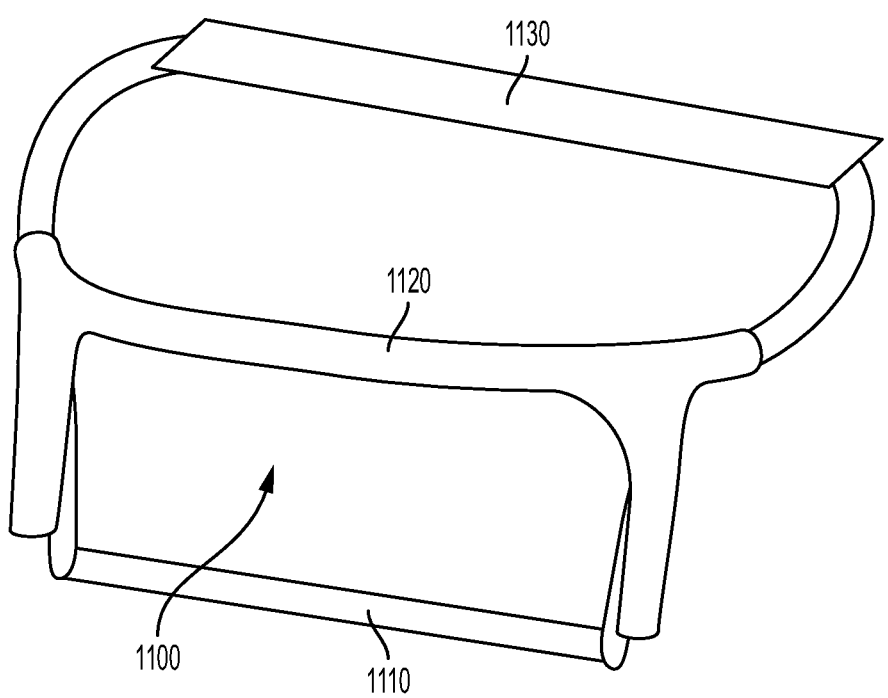
FIG. 11 is a perspective view of cross members for an engine compartment, according to an exemplary embodiment.

A twelve-cornered cross section in accordance with the present teachings is contemplated for use with a number of structural members such as a front rail (e.g., front rail 910 in frame 900 of FIG. 9), a side rail (e.g., side rail 920 in frame 900 of FIG. 9), a cross member (e.g., cross members 1110, 1120, 1130 for engine compartment 1100 in FIG. 11), roof structures (e.g., roof rail 1000 of FIG. 10), and other components that can benefit from increased crash energy absorption. In addition, the present teachings can be applied to both body-on-frame and unitized vehicles or other type of structures.

Figure 5B:
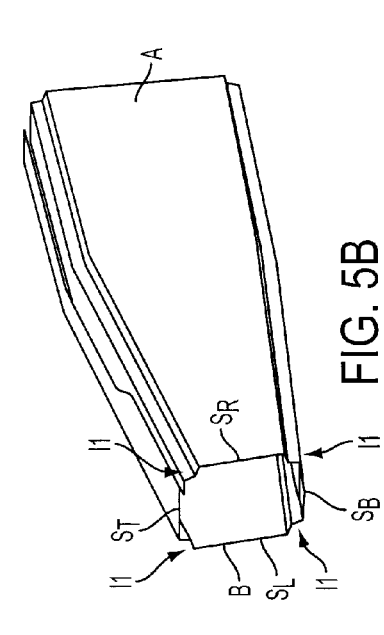
FIGS. 5A-5D illustrate a vehicle front rail without convolutions, having varying cross sections including twelve-cornered cross sections in accordance with the present teachings.
Figure 5D:
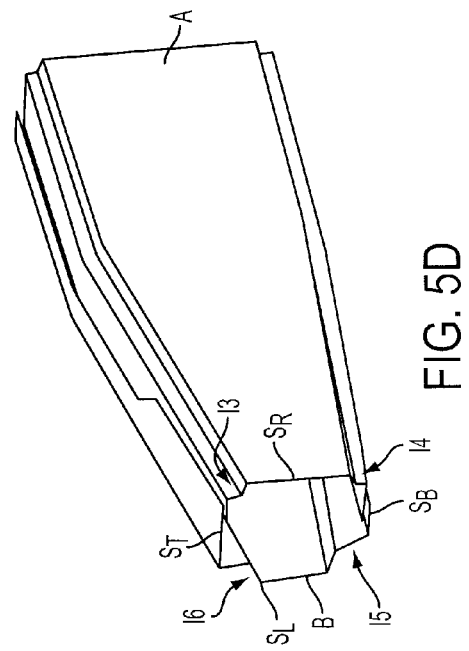
Figure 5A:
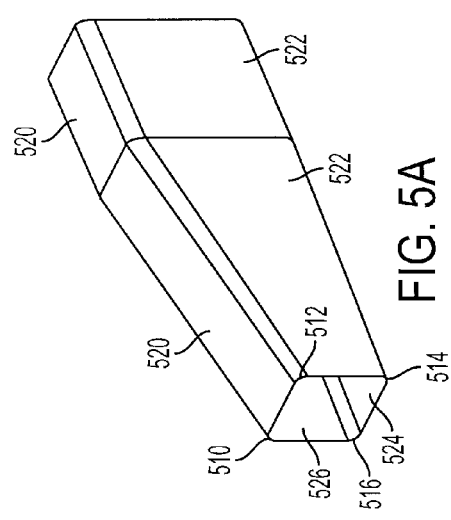
Figure 5C:
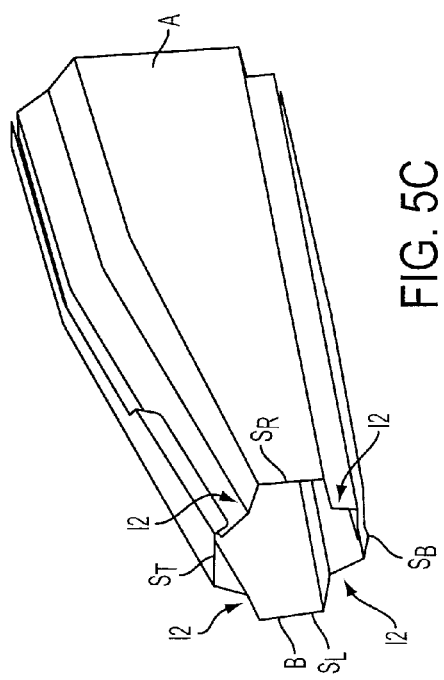

FIGS. 5A-5D illustrate exemplary embodiments of a vehicle front rail having a cross section in accordance with the present teachings. The front rail is of a type without convolutions. FIG. 5A illustrates a front rail having a known, substantially rectangular cross section with four corners 510, 512, 514, 516 of about ninety degrees, and four sides 520, 522, 524, 526. FIGS. 5B through 5D illustrate front rails having twelve-cornered cross sections in accordance with the present teachings, the corner indentations I1 in FIG. 5C being greater than the indentations I2 in FIG. 5B. In these illustrated exemplary embodiments, the rails have a two-part construction comprising pieces A and B. The present teachings contemplate rails of other construction such as one-piece or even 3-or-more piece construction, the number of pieces in FIGS. 5A through 5D being exemplary only.

The embodiments of FIGS. 5B and 5C include top and bottom sides $S_B$ and $S_T$ having substantially the same length as each other, and left and right sides $S_L$ and $S_R$ also having substantially the same length as each other. Piece A includes side $S_R$ and part of sides $S_B$ and $S_T$. Piece B includes side $S_L$ and part of sides $S_B$ and $S_T$. To simplify FIGS. 5B-5D, all of the sides $S_1$ through $S_{10}$, as illustrated in FIG. 1, are not labeled but are of course present. Similarly, the eight internal corners (angles: $\theta_{i1}$-$\theta_{i8}$) and four external corners (angles: $\theta_{e1}$-$\theta_{e4}$), as illustrated in FIG. 1, are not labeled but are present.

FIG. 5D illustrates a front rail having a twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 5D, corner indentations I3 and I4 have the different depths, corner indentation I4 being shallower than corner indentation I3. Corner indentations I5 and I6 have substantially the same depth as each other, that depth differing from the depths of corner indentations I3 and I4. The top and bottom sides $S_B$ and $S_T$ have different lengths, with $S_T$ being longer than $S_B$, and the left and right sides $S_L$ and $S_R$ have differing lengths, with $S_R$ being longer than $S_L$. The internal and external angles θ may also differ as a result of the differing side lengths and corner indentation depths. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles θ.

For a front rail comprising SAE1010 material, a front rail as illustrated in FIG. 5B (with shallower indentations) can save, for example, about 17% weight compared to a square or rectangular cross section, and a front rail as illustrated in FIG. 5C (with deeper indentations) can save, for example, about 35% weight. For a front rail comprising DP600 material, a front rail as illustrated in FIG. 5B (with shallower indentations) can save, for example, about 23% weight and a front rail as illustrated in FIG. 5C (with deeper indentations) can save, for example, about 47% weight. Such weight savings are realized because the increased strength of the twelve-cornered cross section allows the use of a thinner gauge material to provide the same strength.

FIGS. 6A-6D illustrate exemplary embodiments of a vehicle front rail having a cross section in accordance with the present teachings. The front rail is of a type with convolutions. FIG. 6A illustrates a convoluted front rail having a known, substantially rectangular cross section with four corners 610, 612, 614, 616 of about ninety degrees, and four sides 620, 622, 624, and 626. FIGS. 6B through 6D illustrate convoluted front rails having twelve-cornered cross sections in accordance with the present teachings, the corner indentations I8 in FIG. 6C being greater than the indentations I7 in FIG. 6B. In these illustrated exemplary embodiments, the rails have a two-part construction with pieces C and D. As stated above, the two-piece constructions shown in FIGS. 6B through 6D are exemplary only and the present teachings contemplate rails of other construction such as one-piece or even 3-or-more piece construction.

The embodiments of FIGS. 6B and 6C include top and bottom sides $S_B$ and $S_T$ having substantially the same length as each other, and left and right sides $S_L$ and $S_R$ also having substantially the same length as each other. Piece C includes side $S_R$ and part of sides $S_B$ and $S_T$. Piece D includes side $S_L$ and part of sides $S_B$ and $S_T$. To simplify FIGS. 6B-6D, all of the sides $S_1$ through $S_{10}$, as illustrated in FIG. 1, are not labeled but are present. Similarly, the eight internal corners (angles: $\theta_{i1}$-$\theta_{i8}$) and four external corners (angles: $\theta_{e1}$-$\theta_{e4}$), as illustrated in FIG. 1, are not labeled but are present.

FIG. 6D illustrates a convoluted front rail having twelve-cornered cross section, the rail being formed with different depths of indentations, for example to accommodate packaging constraints of a vehicle's engine compartment. In accordance with such an embodiment needing to have a varied shape to accommodate engine compartment constraints, to achieve optimized axial crush performance, the thicknesses of the sides, angles of the corners, and indentation depths can all be adjusted to provide optimal strength, size and shape. In the example of FIG. 6D, corner indentations I9 and I10 have the different depths, with corner indentation I10 being shallower than corner indentation I9. Corner indentations I11 and I12 have substantially the same depth as each other, that depth differing from the depths of corner indentations I9 and I10. The top and bottom sides $S_B$ and $S_T$ have different lengths, with $S_T$ being longer than $S_B$, and the left and right sides $S_L$ and $S_R$ have differing lengths, with $S_R$ being longer than $S_L$. The internal and external angles θ may also differ as a result of the differing side lengths and corner indentation depths. The present teachings also contemplate a twelve-cornered cross section where each of the corner indentations has a different depth and a different angle, and each of the sides has a different length, or where some of the sides have the same length and some of the corner indentations have the same depth and perhaps the same internal and external angles θ.

For a convoluted front rail comprising SAE1010 material, a front rail as illustrated in FIG. 6B (with shallower indentations) can save, for example, about 20% weight compared to a square or rectangular cross section, and a front rail as illustrated in FIG. 6C (with deeper indentations) can save, for example, about 32% weight. For a convoluted front rail comprising DP600 material, a front rail as illustrated in FIG. 6B (with shallower indentations) can save, for example, about 30% weight and a front rail as illustrated in FIG. 6C (with deeper indentations) can save, for example, about 41% weight.

Figure 7:
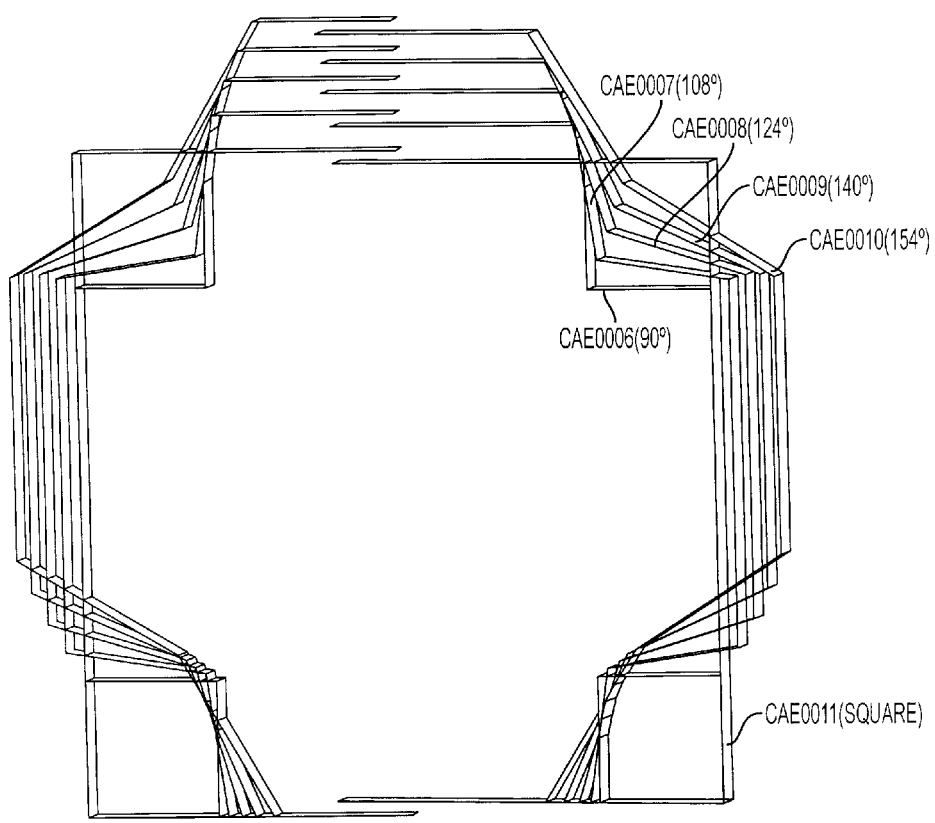
FIG. 7 illustrates geometries of twelve-cornered cross sections of varying shapes and a square cross section having the same thickness and perimeter.
Figure 8:
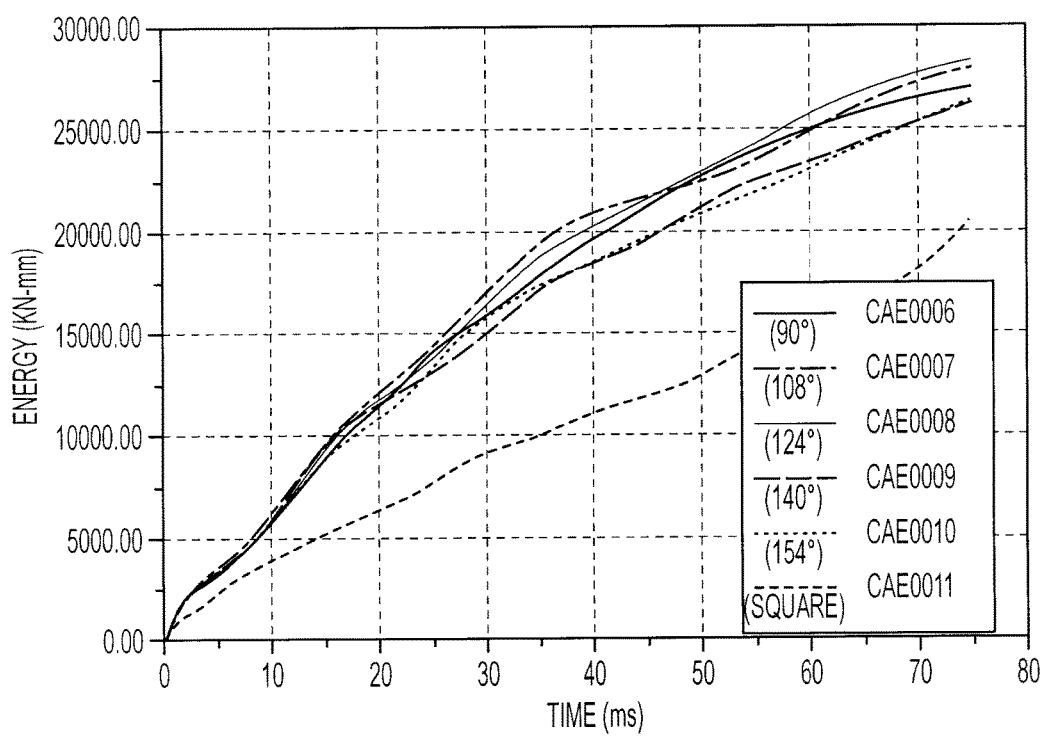
FIG. 8 shows the comparison of the crash energy absorbed (for a given force) by strengthening members having the exemplary cross sections illustrated in FIG. 7.

Strengthening members having a variety of cross sections are illustrated in FIG. 7. As can be seen, CAE006 has a twelve-cornered cross section with external angles of 90°. CAE007 has a twelve-cornered cross section with external angles of 108° in accordance with the present teachings. CAE008 has a twelve-cornered cross section with external angles of 124° in accordance with the present teachings. CAE009 has a twelve-cornered cross section with external angles of 140°. CAE010 has a twelve-cornered cross section with external angles of 154°. Finally, CAE011 has a square cross section. A comparison of the axial crush strength of the illustrated square and twelve-cornered cross sections having differing external angles is illustrated in FIG. 8. As can be seen, the overall axial crush strength of the strengthening member having a twelve-cornered cross section is far greater than that of the strengthening member having a square cross section.

As can further be seen, the exemplary strengthening members with twelve-cornered cross sections having external angles of 108° and 124° show an overall increase in axial crush strength over twelve-cornered cross sections having external angles of 90°. In fact, deviation of the angles from 90° such that each internal angle is about the same as other internal angles and ranges from about 100° to about 110°, and each external angle is about the same as other external angles and ranges from about 105° to about 130°, increases strength without negatively affecting the stability of a crush mode of the strengthening member. Such an increase in strength obviates the need for reinforcing (e.g., thickening) the concave portions at the four corners of the strengthening member, decreasing weight and cost and increasing manufacturing feasibility.

Strengthening members in accordance with the present teachings can comprise, for example, steel, aluminum, magnesium, fiberglass, nylon, plastic, a composite or any other suitable materials.

While the present teachings have been disclosed in terms of exemplary embodiments in order to facilitate a better understanding, it should be appreciated that the present teachings can be embodied in various ways without departing from the scope thereof. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A strengthening member for an automotive vehicle, comprising a twelve-cornered cross section including sides and corners creating internal angles and external angles, wherein each internal angle ranges from about 100° to about 110°, wherein a length of the strengthening member extends between a first end and a second end, and wherein the strengthening member tapers along at least a portion of its length.

2. The strengthening member of claim 1, wherein each external angle ranges from about 105° to about 130°.

3. The strengthening member of claim 1, wherein the corners of the cross section have substantially the same thickness as the sides of the cross section.

4. The strengthening member of claim 1, wherein the corners of the cross section have substantially the same hardness as the sides of the cross section.

5. The strengthening member of claim 1, wherein a thickness of the sides and corners ranges from about 0.7 mm to about 6.0 mm.

6. The strengthening member of claim 1, wherein each internal angle has substantially the same angular degree as the other internal angles and each external angle has substantially the same angular degree as the other external angles.

7. The strengthening member of claim 1, wherein a length of each of the sides of the twelve-cornered cross section is the same.

8. The strengthening member of claim 1, wherein at least one of the sides of the twelve-cornered cross section differs in length from one of the other sides of the twelve-cornered cross section.

9. The strengthening member of claim 2, wherein some of the external angles differ in angle measure.

10. The strengthening member of claim 2, where each of the external angles differ in angle measure.

11. The strengthening member of claim 1, wherein the internal angles and the external angles of the cross section consist of eight internal angles and four external angles.

12. A motor vehicle, comprising:
an engine compartment;
a front rail;
a side rail;
a roof structure; and
a strengthening member comprising a twelve-cornered cross section including sides and corners creating eight internal angles and four external angles;
wherein each internal angle and each external angle is greater than 90°; and wherein at least a portion of a length of the strengthening member tapers so that a cross-sectional area of the twelve-cornered cross section changes along a longitudinal axis of the strengthening member; and wherein the strengthening member forms at least a part of one of the front rail, the side rail, the roof structure, or a cross member of the engine compartment.

13. The motor vehicle of claim 12, wherein each of the internal angles ranges from about 100° to about 110° greater than.

14. The motor vehicle of claim 12, wherein each external angle ranges from about 105° to about 130°.

15. The motor vehicle of claim 12, wherein the cross section has a one piece construction.

16. The motor vehicle of claim 12, wherein the cross section has a two piece construction.

17. The motor vehicle of claim 12, wherein the portion of the strengthening member that tapers is located at a front end of the strengthening member with respect to the motor vehicle.

18. The motor vehicle of claim 12, wherein the strengthening member comprises at least one of steel, high strength steel, aluminum, magnesium, fiberglass, nylon, and plastic.

19. A strengthening member for an automotive vehicle, comprising a twelve-cornered cross section including sides and corners creating eight internal angles and four external angles, wherein each internal angle and each external angle is greater than 90°, wherein at least a portion of a length of the strengthening member tapers so that a cross-sectional area of the twelve-cornered cross section changes along a longitudinal axis of the strengthening member.

20. The strengthening member of claim 19, wherein the strengthening member comprises at least one of steel, high strength steel, aluminum, magnesium, fiberglass, nylon, and plastic.

21. The strengthening member of claim 19, wherein each external angle ranges from about 105° to about 130°.

22. The strengthening member of claim 19, wherein each internal angle ranges from about 100° to about 110°.

23. A method for manufacturing a strengthening member for an automotive vehicle, the strengthening member having a twelve-cornered cross section including sides and corners creating internal angles and external angles, wherein each internal angle and each external angle is greater than 90°, and wherein at least a portion of a length of the strengthening member tapers along a longitudinal axis of the strengthening member, the method comprising:

stamping or pressing two or more sections of the strengthening member;

joining the two or more sections by one or more of welding, adhesion, and fastening to form a cross section having eight internal angles and four external angles.

24. The method of claim 23, further comprising forming the internal angles such that each internal angle ranges from about 100° to about 110°.

25. The method of claim 23, further comprising forming the external angles of the strengthening member such that each external angle ranges from about 105° to about 130°.

26. The method of claim 23, further comprising forming the strengthening member from at least one of steel, high strength steel, aluminum, magnesium, fiberglass, nylon, and plastic.

* * * * *